Dec. 31, 1935.  A. FRUM  2,026,382
TRANSMITTER CONTROL
Filed Jan. 20, 1933
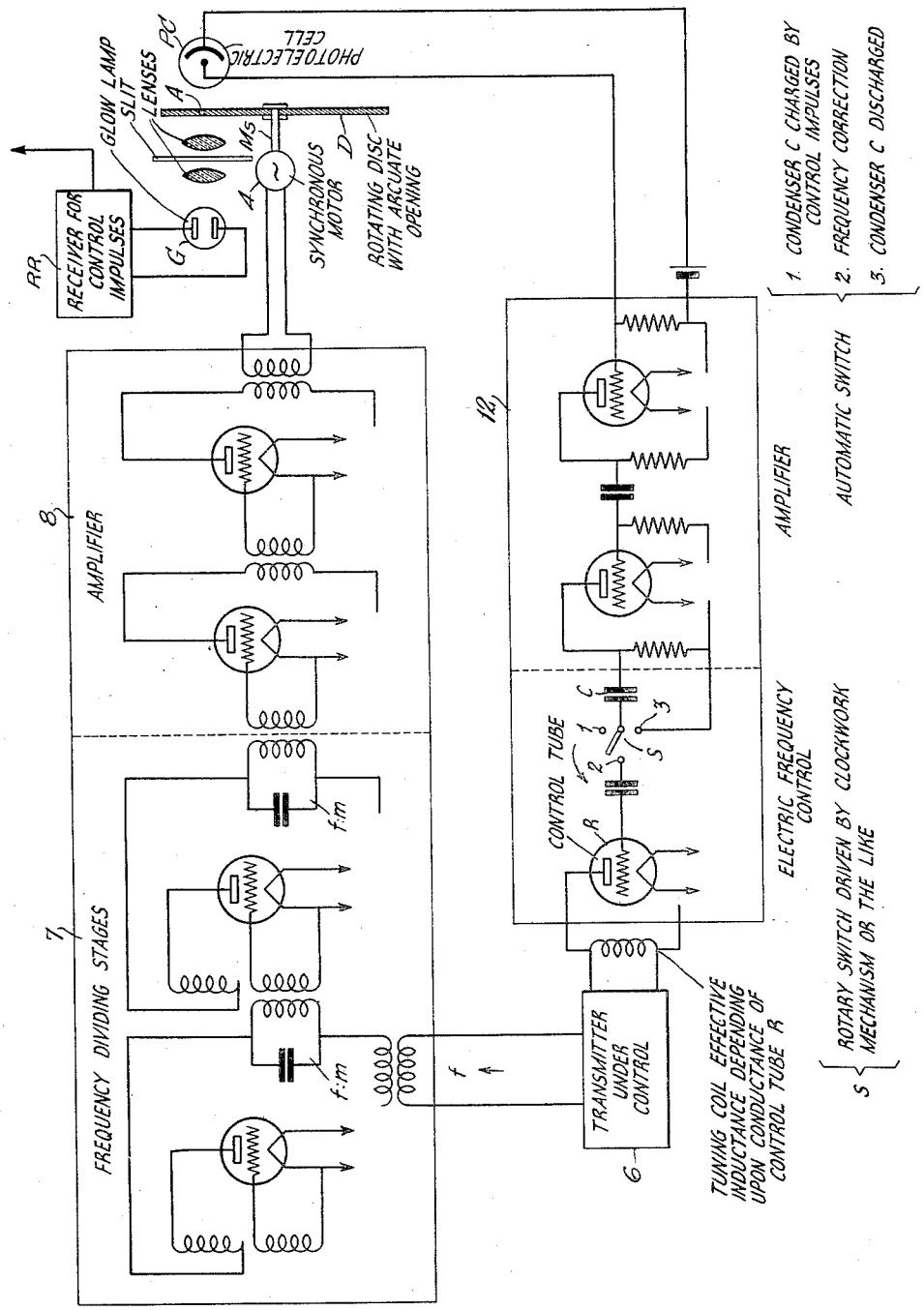
INVENTOR
ALEXANDER FRUM
BY
ATTORNEY Patented Dec. 31, 1935

2,026,382

UNITED STATES PATENT OFFICE 2,026,382

TRANSMITTER CONTROL

Alexander Frum, Berlin, Germany, assignor to Telefunken Gesellschaft für Drahtlose Telegraphie m. b. H., Berlin, Germany, a corporation of Germany Application January 20, 1933, Serial No. 652,684
In Germany February 11, 1932

6 Claims. (Cl. 250—36)

This invention relates to a method of and means for stabilizing the frequency of one or more transmitters. In the present specification a method is disclosed whereby a plurality of transmitters, by control means operable at a central point or station, are maintained as closely as feasible at a constant frequency.

The assumption is made that the various transmitters to be supervised are operated essentially independently of one another and of the central station, and, further, that they are inherently fairly constant and stable in their wave-length. In order that such discrepancies or frequency deviations as are liable to arise in the course of time may be eliminated, the frequency, at certain time intervals, is automatically corrected and restored to the accurate value, such automatic correction being accomplished by check-up impulses or time signals.

Each of the transmitter equipments is furnished with a control device comprising substantially three elements, to wit: a frequency meter or indicator adapted to indicate the instantaneous (momentary) frequency or the mean frequency prevalent during the last check-up period; secondly, a device adapted to receive or pick-up the check-up impulses coming in from the central station and to feed the same to the frequency indicator; and according to the phase position or relation of the frequency indicator on the arrival of the control impulses, which is a measure or criterion for the frequency discrepancy, a third device will be actuated and brought to act mechanically, thermally, optically or electrically upon some suitable frequency-governing element of the transmitter in such a way that the desired frequency will be restored.

One specific application and use of the method as hereinbefore described would approximately be as shown in the single figure and described hereinafter. The frequency control is effected by the agency of electric time-signals or other control impulses which are picked up by the aid of a suitable receiver RR. The frequency indicator consists of a synchronous motor 4 which is driven by the frequency to be maintained constant and stable, or by a sub-harmonic thereof. For instance, if the desired or nominal wave of the transmitter 6 under control is 1 million cycles per second, its five-thousandth sub-harmonic, which, e. g., is produced by the aid of frequency dividing means 7 which may be of the multivibrator type, would be 200 cycles per second. Suppose the latter wave after amplification in 8 operates a four-pole synchronous motor 4 running on 100 cycles, i. e., 6000 revolutions per minute. The interval between consecutive check-up impulses shall be 1000 seconds. Inside this period of time, at a speed as indicated, the motor makes $10^5$ revolutions; hence, a departure in frequency of $10^{-7}$ would correspond to an angular deviation of the rotor of $$\frac{10^5}{10^7} = 1/100\text{th} = 3.6 \text{ degr.}$$

This angular deviation, which would be present at the time of arrival of the time-signal or control impulse, therefore, must result in a frequency correction of $10^{-7}$. The presupposition here is that the motor 4 operates with practically perfect phase-constancy. In order that this condition may be fulfilled, the voltage supplied thereto should be constant and the load be made as small as possible, otherwise a greater number of poles and a correspondingly higher driving frequency must be used. In the case of low loads it is advisable to dispense with the actuation of mechanical switches or the like by the motor itself and to have recourse to the optical scheme shown in the drawing.

Seated upon the motor spindle $M_s$ is a low-weight disk D having a section or recess, arcuate-shaped recess, of appreciable radial width, A, cut out of it in a position parallel to the periphery of the disk. Mounted in front of the disk and radially with respect thereto is arranged an elongated glow-discharge, gaseous-conduction, lamp G, while posteriorly of the disk is a photo-electric cell PC. A lens system cooperating with a mask which has a slit therein concentrates and directs the rays from G on the opening A in the disc D. The controlling impulses, after having been adequately amplified in RR, furnish the flashing voltage for the glowlamp G; the duration thereof, for the sake of argument, shall be supposed to be equal to the time required for the entire cut-out portion in the disk to travel past the glow-lamp. According to the angular position of the rotor, when the lamp is caused to flash up, until the instant of covering or shutting off the glow-lamp, more or less light will be transmitted through the disk and this releases in the phototube PC more or less long current impulses. These are amplified in 12 and serve, for instance, for the charging of a condenser C, the discharge current of the latter serving to actuate the mechanical means designed for insuring correction of the frequency. Preferably the condenser C may have one terminal connected to the anode of the final stage in 12 and the other terminal connected to the movable arm of a switch S, driven by clock works not shown. The arm of the switch S when rotated bears on contacts 1, 2 and 3 successively. When the rotatable switch arm is on contact 1 the condenser C is connected by a circuit not completely shown between the output electrodes of the final stage of the amplifier 12 at the instant the source RR receives a control impulse. The condenser is then charged. The switch arm then moves to contact 2 to energize the control tube R which has its output electrodes connected with an inductance which determines in part the frequency of the oscillations produced by the controlled transmitter 6. The switch arm now moves to contact 3 which shorts the condenser to discharge the same more or less completely. In operation it is necessary that the condenser C receive a charge commensurate with the length of the light beam permitted to fall on PC. The charge in the condenser should accordingly be brought to the same value after each impulse.

In the presence of very brief check-up impulses, instead of a strip or cut-out of constant width, a strip of increasing width may be formed in the disk with the result that the momentary illumination of the photo-electric cell will vary in accordance with the angular position of the rotor.

A method very similar to the preceding one would be as follows: After a certain relatively large number of oscillations of the transmitter, in the above instance, after $10^6 \times 1000$ oscillations, the frequency indicator would cause the production of a current impulse. In the presence of exact coincidence between the actual and the desired frequency, the said impulse would also coincide with a control impulse furnished from a master clock. In the presence of frequency departures, two impulses at more or less great time differences will be obtained, and these are used for correction of the frequency by automatic means in accordance with the amount of this time interval.

Having thus described my invention and the operation thereof, what I claim is:

1. Means for periodically checking the frequency of an oscillation transmitter comprising, means for producing oscillations of reduced frequency characteristic of the frequency of the transmitter oscillations, a disk, means for driving said disk at a speed characteristic of the said reduced frequency, said disk having an arcuate opening therein, a glow lamp mounted adjacent the opening in said disk, periodic control impulse receiving means connected with said glow lamp to energize the same when an impulse is received, a photoelectric cell mounted on the other side of said disk adjacent said arcuate opening in the path of rays from said glow lamp, and a control device connected in a circuit with said cell and to said transmitter the frequency of which is to be controlled.

2. Means for periodically checking and controlling the frequency of an oscillation transmitter including oscillation frequency determining means comprising, means for producing oscillations of reduced frequency characteristic of the frequency of the transmitter oscillations, a disk, means for driving said disk at a speed characteristic of the said reduced frequency, said disk having an arcuate opening therein, a glow lamp mounted adjacent the opening in said disk, periodic control impulse receiving means connected with said glow lamp to energize the same when an impulse is received, a photoelectric cell mounted on the other side of said disk adjacent said arcuate opening in the path of rays from said glow lamp, amplifying means connected in circuit with said cell, and frequency determining means connected at its input with said amplifying means and at its output with said transmitter frequency determining means.

3. The method of periodically checking the frequency of oscillations which includes the step of, reducing the frequency of said oscillations to produce a sub-harmonic thereof, periodically producing energy impulses of constant intensity and of a standard duration, modifying the duration of said energy impulses in accordance with the frequency of said subharmonic of said reduced frequency, and controlling the frequency of the oscillations to be checked in accordance with said modified energy impulses.

4. The method of periodically checking the frequency of oscillations which includes the steps of, reducing the frequency of said oscillations to produce a sub-harmonic thereof, periodically producing light rays of constant strength and of pre-determined duration, modifying the duration of said light rays in accordance with the relation between the frequency of said sub-harmonic of said reduced frequency and the period of said light rays and controlling the frequency of the oscillations to be checked in accordance with said modified light rays.

5. The method of periodically checking the frequency of oscillations which includes the steps of, producing oscillations of a frequency which is a sub-harmonic of the frequency of the oscillations to be checked, periodically producing energy impulses of constant intensity and of a standard duration separated by predetermined time intervals, modifying the duration of said energy impulses in accordance with the deviation of the frequency of oscillations of said harmonic frequency from its normal frequency, and controlling the frequency of the oscillations to be checked in accordance with said modified energy impulses.

6. The method of periodically checking the frequency of oscillations which includes the steps of, reducing the frequency of said oscillations to produce a sub-harmonic thereof, periodically prducing light rays of constant strength and of predetermined duration, modifying the duration of said light rays in accordance with the relation between the frequency of said sub-harmonic of said reduced frequency and the period of said light rays, producing current impulses of constant intensity and a duration which is a function of the duration of the modified light rays, and controlling the frequency of the oscillations to be checked in accordance with said modified light rays.

ALEXANDER FRUM.